United States Patent Office 3,819,773
Patented June 25, 1974

3,819,773
METHOD FOR PREPARING RECLAIMABLE COATED POLYESTER FILMS
Gordon Edmund Alfred Pears, Harpenden, England, assignor to Imperial Chemical Industries Limited, London, England
No Drawing. Continuation-in-part of abandoned application Ser. No. 52,763, July 6, 1970. This application Aug. 21, 1972, Ser. No. 282,054
Claims priority, application Great Britain, July 15, 1969, 35,556/69
Int. Cl. B29c 29/00; B29d 7/24; B32b 27/36
U.S. Cl. 264—37                                     7 Claims

ABSTRACT OF THE DISCLOSURE

Coating extruded polyester films with a reclaimable thermosetting acrylic or methacrylic composition before or during the orientation stretching steps and refeeding the coated film with fresh polyester to the film forming extruder.

---

The present application is a continuation-in-part of copending application Ser. No. 52,763, filed July 6, 1970, now abandoned.

This invention relates to coated films of synthetic linear polyesters, particularly of polyesters derived essentially from ethylene glycol and terephthalic acid.

U.K. Specification No. 1,078,813 describes and claims a process for the production of a heat seal coated, biaxially oriented synthetic linear polyester film comprising the steps of melt extruding a substantially amorphous film, drawing the film in the longitudinal direction, thereafter applying a heat seal coating to one or both sides of said film and further drawing the coated film in the transverse direction.

According to the present invention a process for the production of a biaxially oriented synthetic linear polyester film comprises melt extruding a substantially amorphous polyester film, and thereafter biaxially orienting the film by stretching in mutually perpendicular directions, said process including a step for coating the film with a primer coating whereby the final coating thickness after the film has been oriented is at least $10^{-7}$ inch, in which the primer coating comprises a cross-linkable acrylic or methacrylic composition which is applied to the film before stretching is effected in the transverse direction.

The coated film produced by such a process has been found to be reclaimable so that it can be recycled with fresh polyester without impairing the quality and properties, such as colour and appearance, of the film as is likely to occur by the degradation of some commonly known polymeric coating compositions if they were to be recycled.

The cross-linkable acrylic or methacrylic compositions are polymers or copolymers of acrylic acid or methacrylic acid or their esters containing functional groups, such as hydroxy, carboxyl, amide and oxirane groups, desirably including a suitable cross-linking catalyst, e.g. ammonium chloride.

Preferably the composition also includes a condensation product of an amine, such as melamine, urea and diazines or their derivatives, with formaldehyde, which may be alkylated. A suitable composition is based on an ethyl acrylate/methyl methacrylate/methacrylamide copolymer and an ethylated amine/formaldehyde condensate. The coating may be applied from an aqueous or organic medium, but preferably as an aqueous dispersion.

The coating compositions which are applied to the film may include in addition to the major constituent, wetting agents, antioxidants, dyes, pigments, lubricants, antiblocking agents and/or slip agents, i.e. comminuted solids which are insoluble in the coating, e.g. starch, talc, zinc oxide, calcium carbonate, silica, titanium dioxide, triferric tetroxide, silicates, aluminates, alumino silicates and discrete particles of polymeric materials such as polyvinyl chloride or polymethyl methacrylate.

The amount of coating composition applied to the film surface should be chosen to take account of the thinning which occurs when the film is stretched. When the film is biaxially oriented at commonly employed draw ratios the coat weight should be 9 to 12 times that which is required on the full oriented and heat set film.

Our preferred polyester is polyethylene terephthalate and films of this are oriented (as is well known) by stretching them at a temperature within the range of from 78° C. to 125° C.

Various known types of apparatus which are designed to stretch continuous lengths of film in the machine and transverse directions are suitable for use in the drawing processes of this invention. The film may be stretched in either order, that is stretching first in either the longitudinal or transverse direction followed by stretching in the other direction, or in both directions simultaneously. For example, the film may conveniently be stretched in the longitudinal direction by passing it between or around a pair or a series of slow rollers which may be heated to the desired temperature and then between or around a pair or a series of fast rollers. A useful alternative method of heating the film is by means of radiant heat, applied to a small length of film between the fast and slow rollers. The film may be stretched in the transverse direction in a stenter apparatus. For drawing in a stenter, oven heating is preferred. We prefer to carry out the longitudinal drawing at a temperature of from 78° C. to 100° C. and the transverse drawing at a temperature of from 80° C. to 125° C. The film may be drawn at any draw ratio commonly employed in the production of polyester film, generally up to about 4.5 times in each direction. Convenient draw ratios are about 3.5 times in each direction. The invention can also be employed for the coating of asymmetrically oriented, i.e. tensilised film, which may be produced by an orientation process in which film is firstly biaxially oriented and then subjected to a further stretching operation in the longitudinal direction or the film may be stretched firstly in the transverse direction and then in the longitudinal direction to a greater extent.

The biaxially oriented and coated film may conveniently be heat set at a temperature ranging from 150° C. to 240° C.

According to this invention the primer coating is applied to the film before stretching is effected in the transverse direction. Thus the coating composition may be applied to the film following extrusion and quenching and before the first stretching operation. Alternatively the composition can be applied between the sequential stretching operations in different directions when the second operation is in the transverse direction. When balanced film is produced by stretching in the longitudinal and transverse directions to a similar extent it is normal practice to stretch the film firstly in the longitudinal direction and then in the transverse direction and the primer coating may be applied before stretching in the longitudinal direction or alternatively after stretching in that direction and before stretching in the transverse direction. The latter operation is preferred as it may be possible to dry the organic or aqueous medium used to apply the coating in the hot air oven which is generally associated with the stenter apparatus used for transverse stretching.

If tensilised film is to be coated by this invention and the film is oriented by further stretching biaxially oriented film then the primer coating may be applied at the time in the process described above in relation to balanced film.

It is necessary to remove the organic medium or water from the coating composition at some stage during the process. Drying may conveniently be effected in an air oven maintained at a temperature of 80° C. to 125° C., conveniently from 90° to 110° C., or by radiant heating means but excessive crystallinity should not be allowed to develop during the drying step if the film is to be oriented afterwards.

If the application of the coating composition is followerd immediately by stretching in the longitudinal direction the coating should be adequately dried before stretching is commenced to avoid any possibility of the coating adhering to the rollers used for longitudinal stretching. The drying operation may also serve as a preheating stage for longitudinal stretching, if desired.

Drying should also normally be effected before stretching is commenced when the film is stretched transversely before stretching in the longitudinal direction. For transverse stretching it is common practice to employ a stenter apparatus comprising sets of edge grips running along a pair of diverging rails in a hot air oven and it may not be necessary to employ a separate drying apparatus, although it is much preferred to complete drying before transverse stretching is commenced.

The coating compositions of this invention are particularly useful since the coated film may be reclaimed without impairing the quality, colour and appearance of the film to an appreciable extent. It is possible to refeed scrap coated film together with fresh polyester to the film forming extruder and to quench the extrudate in the normal manner to produce an amorphous film which may be oriented in one or more directions and heat set in known manner to provide a film in which any adverse properties introduced by the presence of the coating composition are insignificant. The re-extruded film may include up to about 1.0% by weight of the coating composition, preferably up to 0.5% by weight and may of course be coated with acrylic or methacrylic compositions by the process of this invention.

The coatings provided by this invention exhibit good adhesion to the film support and the coated films themselves exhibit good adhesion to the commonly employed film coatings, e.g. vinylidene dichloride coatings as barrier coatings for packaging, printing inks, magnetic coatings, sensitive diazo coatings and thin metal coatings. The film coated with cross-linked acrylic or methacrylic compositions exhibit good slip and anti-blocking properties.

The invention is illustrated by the following examples.

EXAMPLE 1

A layer of polyethylene terephthalate was melt extruded, cast on to a cooled rotating drum and stretched in the direction of extrusion about 3.5 times its original length. The film was coated by a roller coating technique with an aqueous latex of the composition given below, parts being calculated by weight.

| | Parts |
|---|---|
| Thermosetting acrylic composition based on polyethyl acrylate and an amine/formaldehyde condensate | 9.5 |
| Poly(ethylene oxide-propylene oxide) emulsifier | 0.3 |
| Ammonia 4% aqueous solution | 0.2 |
| Water | 90 |

The coated film was passed into a stenter oven where the coating was dried, the dried coated film then stretched transversely until it was about 3.5 times its original width and finally heat set at a temperature of about 200° C. The final coat thickness was $2.4 \times 10^{-6}$ inch on both sides of the film which had a total thickness of $3 \times 10^{-3}$.

The coated film was re-extruded with 75% by weight and 50% by weight of fresh polymer and drawn and heat set in the manner indicated above to make separate films. Comparative control films were also made by re-extruding uncoated film made by the process described above with 75% by weight and 50% by weight of fresh polymer and drawn and heat set by the above process. The physical and mechanical properties were substantially unaffected by the presence of the coating material in the re-extruded film as shown by the following table, in which MD corresponds to the measurement of the property in the machine direction of the film; and TD corresponds to the measurement of the property in the transverse direction of the film.

| | Control 75% fresh polymer 25% uncoated film | Reclaim 75% fresh polymer 25% coated film | Control 50% fresh polymer 50% uncoated film | Reclaim 50% fresh polymer 50% coated film |
|---|---|---|---|---|
| Modulus (kg./mm.²): | | | | |
| MD | 462 | 460 | 445 | 484 |
| TD | 542 | 432 | 468 | 532 |
| Yield strength (lb./in.²): | | | | |
| MD | 14,550 | 15,300 | 15,000 | 14,300 |
| TD | 14,300 | 15,900 | 15,500 | 14,350 |
| Breaking strength (lb./in.²): | | | | |
| MD | 23,200 | 24,850 | 22,900 | 24,100 |
| TD | 28,750 | 28,050 | 27,000 | 26,200 |
| F₅ (lbs./in.²): | | | | |
| MD | 13,000 | 13,500 | 13,500 | 12,750 |
| TD | 13,200 | 14,375 | 14,100 | 12,500 |
| Elongation, percent: | | | | |
| MD | 248 | 186 | 193 | 258 |
| LD | 204 | 173 | 166 | 185 |
| Shrinkage (percent) | 1.5 | 1.0 | 1.5 | 1.0 |
| Haze (percent) | 11.0 | 11.5 | 10.0 | 11.0 |
| Slip | 0.40 | 0.38 | 0.35 | 0.35 |
| Intrinsic, film | 0.551 | 0.536 | 0.511 | 0.510 |
| Viscosity, polymer | 0.580 | 0.580 | 0.550 | 0.540 |

A further experiment was effected to simulate the affect of several film reclaim cycles on the appearance of the film. A sample of coated film was cut into chips, dried and re-extruded on to a cooling drum on which it was quenched to an amorphous film. This process was repeated for six extrusions, each having a dwell time at 250–280° C. of 1.5 to 2.0 minutes. The visual appearance of the extrudate showed a gradual increase in yellowness but even the sixth extrudate was not excessively yellow.

The coated film exhibited excellent adhesion to lacquers containing light sensitive diazo compounds and cellulose acetate butyrate and cellulose acetate propionate.

EXAMPLE 2

A web of polyethylene terephthalate was extruded in conventional manner from a slit die on to the polished surface of a cooled rotating drum upon which the web was quenched to below the glass transition temperature of the polymer to provide an amorphous film.

A coating composition consisting of an aqueous latex having the following composition was prepared, parts being calculated by weight:

| | Parts |
|---|---|
| Cross-linkable acrylic composition comprising 87% by weight of copolymer of ethyl acrylate, methyl methacrylate and methacrylamide (45%, 50% and 5% by weight) and 13% by weight of ethylated melamine formaldehyde | 9.6 |
| Poly(ethylene oxide-propylene oxide)emulsifier | 0.3 |
| Ammonium chloride (catalyst) | 0.1 |
| Water | 90 |

The above composition was applied to both surfaces of the amorphous film by a roller coating technique, the applied coat thickness on each surface being $10^{-4}$ inch. The coated film was then passed through a hot air oven maintained at a temperature of 95° C. to dry the coating.

The dried film was drawn about 3.5 times its original length in the longitudinal direction followed by drawing to the same extent in the transverse direction in a stenter apparatus. Finally the film was heat set at a temperature of about 200° C.

The coating was found to have good adhesion to the film base and did not adhere to the rollers used for longitudinal drawing. The film coating exhibited excellent adhesion to lacquers containing light sensitive diazo compounds and cellulose acetate butyrate and cellulose acetate propionate.

The coated film was re-extruded with 75% by weight and 50% by weight of fresh polymer and drawn and heat set in the manner indicated above to make separate films. Comparative control films were also made by re-extruding uncoated film made by the process described above with 75% by weight and 50% by weight of fresh polymer and drawn and heat set by the above process. The physical and mechanical properties were substantially unaffected by the presence of the coating material in the re-extruded film. It was also found that the film properties did not diminish seriously after re-cycling the coated film several times, although the film did exhibit a gradual, but not excessive, increase in yellowness on each cycle.

Example 1 was repeated to coat a sample of tensilised film made by a process in which biaxially oriented film was further stretched in one direction and Example 2 was repeated to coat another sample made by a process of asymmetrically stretching film first in the transverse direction and then in the longitudinal direction. The adhesion of the coating to the film base was strong for both samples and it was found that the film could be recycled without significantly affecting the film properties.

EXAMPLE 3

A two side coated amorphous film was produced as described in Example 1. It was heated to 85° C. and drawn to about 3.3 times its original width in a stenter apparatus followed by drawing to 4.5 times its original length and finally heat set at 205° C. The coating adhered well to the film base and the coated film exhibited excellent adhesion to a magnetic oxide filled polyurethane lacquer.

The coated film was re-extruded with 75% by weight and 50% by weight of fresh polymer and drawn and heat set in the manner indicated above to make separate films. Comparative control films were also made by re-extruding uncoated film made from the process described above with 75% by weight and 50% by weight of fresh polymer and drawn and heat set by the above process. The physical and mechanical properties were substantially unaffected by the presence of the coating material on the re-extruded film and although there was some slight increase in yellowness of the film after multiple recycling of the coated film it did not affect the performance of magnetic tapes made from the film.

EXAMPLE 4

A two side coated amorphous film was produced as described in Example 1 and was drawn 3.0 times its original length at a temperature of about 80° C. The film was then drawn sideways 3.25 times at a temperature of about 90° C. and heat set at 200° C. The film was drawn in the lengthwise direction 1.75 times and then heat set at 210° C.

The coating exhibited strong adhesion to the film base and also adhered well to an overcoating of a magnetic oxide filled polyurethane lacquer.

The coated film was re-extruded with 75% by weight and 50% by weight of fresh polymer and drawn and heat set in the manner indicated above to make separate films. Comparative control films were also made by re-extruding uncoated film made by the process described above with 75% by weight and 50% by weight of fresh polymer and drawn and heat set by the above process. The physical and mechanical properties were substantially unaffected by the presence of the coating material in the re-extruded film and although there was some slight increase in yellowness of the film after multiple recycling of the coated film it did not affect the performance of magnetic tapes made from the film.

I claim:

1. A process for the production of coated biaxially oriented synthetic linear polyester films which comprises melt extruding a substantially amorphous polyester film from a film forming extruder, drawing the film in the longitudinal direction at a temperature of 78° C. to 100° C., thereafter applying a primer coating to one or both sides of said film and then drawing the coated film in the transverse direction at a temperature of 80° C. to 125° C., whereby a primer coating thickness of at least $10^{-7}$ inch is obtained, said primer coating comprising a thermosetting acrylic or methacrylic composition and then re-feeding the coated film product together with fresh polyester to the film forming extruder, the refed coated film being employed in an amount such that the resulting film product contains up to about 1.0% by weight of the primer coating material.

2. A process according to Claim 1, in which the composition comprises a copolymer of ethyl acrylate and the condensation product of an amine with formaldehyde.

3. A process according to Claim 1 in which the synthetic linear polyester is polyethylene terephthalate.

4. The process of Claim 1 wherein the film is drawn longitudinally before coating to about 3.5 times its original length and the coated film is then drawn transversely to about 3.5 times it original width and the thus drawn film is heat set at about 200° C.

5. A process for the production of a biaxially oriented synthetic linear polyester film which comprises melt extruding a substantially amorphous polyester film from a film forming extruder, and thereafter biaxially orienting the film by stretching in mutually perpendicular directions, said process including a step for coating the film with a primer coating whereby the final coating thickness after the film has been oriented is at least $10^{-7}$ inch, in which the primer coating comprises a cross-linkable acrylic or methacrylic composition which is applied to the film before stretching is effected in the transverse direction, wherein the coated film product is refed together with fresh polyester to the film forming extruder, the refed coated film being employed in an amount such that the resulting film product contains up to about 1.0% by weight of the primer coating material.

6. A process according to Claim 5, in which the film is stretched first in the longitudinal direction at a temperature of 78° C. to 100° C. and thereafter in the transverse direction at a temperature of 80° to 125° C. and the primer coating is applied to the film before stretching is effected in the longitudinal direction.

7. A process according to Claim 5, in which the cross-linkable composition comprises a copolymer of ethyl acrylate, methyl methacrylate and methacrylamide, and an ethylated melamine formaldehyde.

References Cited

UNITED STATES PATENTS

| 3,264,136 | 8/1966 | Hedge | 117—7 |
|---|---|---|---|
| 2,627,088 | 2/1953 | Alles et al. | 264—289 |
| 3,573,951 | 4/1971 | Abbott et al. | 117—7 |
| 3,448,183 | 6/1969 | Chisholm | 264—171 |
| 2,337,928 | 12/1943 | Reichel | 264—37 |
| 3,046,605 | 7/1962 | Greif et al. | 264—37 |

FOREIGN PATENTS

| 1,078,813 | 8/1967 | Great Britain | 264—210 R |

JEFFERY R. THURLOW, Primary Examiner

117—7, 138.8 F; 264—129, 141, 171, 210 R

U.S. Cl. X.R.